(12) United States Patent
Kawase

(10) Patent No.: US 7,910,085 B2
(45) Date of Patent: Mar. 22, 2011

(54) PROCESS FOR PRODUCTION OF IRON OXYHYDROXIDE PARTICLES

(75) Inventor: Mika Kawase, Tokyo (JP)

(73) Assignee: TDK Corporation, Tokyo (JP)

( * ) Notice: Subject to any disclaimer, the term of this patent is extended or adjusted under 35 U.S.C. 154(b) by 182 days.

(21) Appl. No.: 12/343,023

(22) Filed: Dec. 23, 2008

(65) Prior Publication Data

US 2009/0169470 A1 Jul. 2, 2009

(30) Foreign Application Priority Data

Dec. 28, 2007 (JP) ................................ P2007-339200
Sep. 30, 2008 (JP) ................................ P2008-252387

(51) Int. Cl.
*C01G 41/00* (2006.01)

(52) U.S. Cl. .......... 423/632; 423/140; 423/142; 423/144; 423/147; 106/456

(58) Field of Classification Search .......... 423/140–147, 423/632–634; 106/456
See application file for complete search history.

(56) References Cited

U.S. PATENT DOCUMENTS

2008/0241055 A1* 10/2008 Kawase et al. ............... 423/632

FOREIGN PATENT DOCUMENTS

| GB | 1567957 | * | 5/1980 |
| JP | 3-228829 | | 10/1991 |
| JP | 3003581 | | 8/1994 |
| JP | 10-182162 | | 7/1998 |

OTHER PUBLICATIONS

S.H. Drissi, et al., "The Preparation and Thermodynamic Properties of Fe(II)-Fe(III) Hydroxide-Carbonate (Green Rust 1); Pourbaix Diagram of Iron in Carbonate-Containing Aqueous Media," Green Rust, Corrosion Science, vol. 37, No. 12,1995, pp. 2025-2041.
M. Zaiyong, et al., "Preparation and Surface Modification of Transparent Yellow Iron Oxide Pigments," Modern Paint and Finishing, vol. 5, May 2004, pp. 27-30.
Ma Shiyu, et al., "Ultramicro Bubble Chemistry and Application," The 10$^{th}$ National Conference of Colloid and Surface Chemistry, Dec. 31, 2004.

* cited by examiner

*Primary Examiner* — Steven Bos
(74) *Attorney, Agent, or Firm* — Drinker Biddle & Reath LLP

(57) ABSTRACT

The process for production of iron oxyhydroxide particles according to the invention is characterized by comprising a step (A) in which a suspension containing iron(II) is prepared, and a step (B) in which fine bubbles with diameters of 0.05-500 μm are generated in the suspension to form a reaction mixture, and the iron(II) in the reaction mixture is oxidized by the bubbles to produce iron oxyhydroxide particles.

5 Claims, 1 Drawing Sheet

PROCESS FOR PRODUCTION OF IRON OXYHYDROXIDE PARTICLES

BACKGROUND OF THE INVENTION

1. Field of the Invention

The present invention relates to a process for production of iron oxyhydroxide particles, which can be used for magnetic recording media, lapping tapes, ink ribbons, cosmetics, coating paints and the like, and which are particularly suitable for use as precursors for magnetic particles in high-density, high-capacity magnetic recording tapes, and as a filler for support surface-smoothing coating materials.

2. Related Background Art

Demand continues to increase for magnetic recording tapes with larger volumes and higher densities, for which purpose such tapes are designed for smaller recording wavelengths and decreased bit lengths or track widths in order to increase recording density. Increased density, in other words, is achieved by improving the recording density and track density. Reducing the bit length and track width, however, decreases the number of magnetic bodies per bit and lowers the SN ratio, thus requiring the use of finer magnetic particles. Moreover, variation in the particle size results in non-uniform dispersion of the magnetic bodies, thus increasing noise. Consequently, the goal of increased density can only be achieved by forming fine particles of uniform particle size.

Wet synthesis methods are known for obtaining iron oxyhydroxide particles as precursors of needle-like magnetic particles. Such wet synthesis methods form iron oxyhydroxide particles by oxidation of ferrous hydroxide obtained by mixing and stirring a starting iron aqueous solution and a neutralizer. The iron oxyhydroxide particles, coated and/or doped with a sintering inhibitor, are then subjected to reduction treatment to obtain needle-like magnetic particles comprising Fe as a constituent element. In order to obtain needle-like magnetic particles with the required level of fineness it is important to control the oxidizing conditions in the ferrous hydroxide nucleation step. Rapid and homogeneous oxidation reaction between gas and liquid is important for controlling the oxidizing conditions. It is known that oxidation reaction is accelerated by controlling the oxidizing conditions, such as the gas/liquid mixing method and the oxygen component ratio. The oxygen component ratio is the volume ratio of oxygen per unit volume.

For control of oxidizing conditions such as the gas/liquid mixing method and oxygen component ratio, there have been hitherto proposed methods of, for example, carrying out the mixing by running gas through a porous plate with a diameter of 2-5 mm to generate fine bubbles, methods of controlling the oxidation rate with an oxygen partial pressure of at least 0.2 atm for the oxidizing gas (for example, Japanese Unexamined Patent Publication HEI No. 3-228829), and methods of dividing the oxidizing step into two stages and further varying the oxidation rate (for example, Japanese Unexamined Patent Publication HEI No. 10-182162).

However, Japanese Unexamined Patent Publication HEI No. 3-228829 cited above teaches that it is difficult to stably obtain fine goethite with an agitating tank reactor or bubble tower reactor, and its production process does not employ an agitating tank reactor. Consequently, since oxidizing gas with an oxygen partial pressure of 0.2 atm or greater is blown in without agitation, the obtained iron oxyhydroxide particles can potentially vary in their particle sizes. In Japanese Unexamined Patent Publication HEI No. 10-182162, the oxidation rate is increased to a prescribed oxidation rate during the step of oxidizing the ferrous hydroxide, and therefore considerable variation can potentially result in the particle sizes of the iron oxyhydroxide particles. Moreover, the particle length (long axis length) of the obtained goethite is approximately 0.05-0.25 μm, which is not a sufficiently micronized level.

SUMMARY OF THE INVENTION

The invention has been accomplished in light of the technical problems mentioned above, and one of its objects is to provide a novel method for production of fine iron oxyhydroxide particles. Another of its objects is to provide a process for production of iron oxyhydroxide particles with uniform particle shapes and low size variation, even when the particles are microparticles.

The present inventors have conducted diligent research from the viewpoint that rapid and homogeneous oxidation reaction of ferrous hydroxide in the nucleation step is important for achieving nano-size iron oxyhydroxide particles. As a result, it was found that decreasing the oxidizing gas bubble size can increase the contact area between the ferrous hydroxide and oxidizing gas, thus accelerating the oxidation rate of the ferrous hydroxide. In other words, the process for production of iron oxyhydroxide particles according to the invention is characterized by comprising a step (A) in which a suspension containing iron(II) is prepared, and a step (B) in which fine bubbles of oxygen-containing gas with diameters of 0.05-500 μm are generated in the suspension to form a reaction mixture and the iron(II) in the reaction mixture is oxidized by the bubbles to produce iron oxyhydroxide particles.

According to the invention, preferably step (A) is a step in which a ferrous salt aqueous solution is mixed with an alkali aqueous solution containing one or more alkali carbonates and alkali hydroxides, while step (B) includes a step of converting the suspension obtained in step (A) into a reaction mixture containing fine bubbles composed of oxygen-containing gas with diameters of 0.05-500 μm, while controlling the constant temperature range to −5 to 30° C., and oxidizing the iron(II) in the reaction mixture at an oxidation rate of 30-65% to obtain an iron oxyhydroxide particle precursor.

In step (B), the oxygen component ratio of the oxygen-containing gas is preferably at least 0.01 and no greater than 0.3.

In step (A), the concentration of Fe in the ferrous salt aqueous solution in the reaction mixture is preferably 0.001-0.1 mol/L.

In step (B), the feed rate of oxygen-containing gas is preferably 0.1-12 L/min per 100 L of reaction mixture.

The process for production of iron oxyhydroxide particles according to the invention can yield iron oxyhydroxide particles with a mean particle length of 20-70 nm and an axial ratio of 3-10.

Thus, according to the invention it is possible to provide fine iron oxyhydroxide particles having a particle length of no greater than 150 nm, preferably no greater than 100 nm and more preferably no greater than 70 nm, and a large axial ratio, specifically 3 or greater. It is also possible to provide iron oxyhydroxide particles that, even as microparticles, have uniform particle shapes and have a narrow particle size distribution, i.e. low size variation.

The iron oxyhydroxide particles obtained by the production process of the invention can be applied for high-capacity, high recording density magnetic recording media with excellent magnetic shape anisotropy and high coercive force.

DESCRIPTION OF THE PREFERRED EMBODIMENTS

Figure 1:
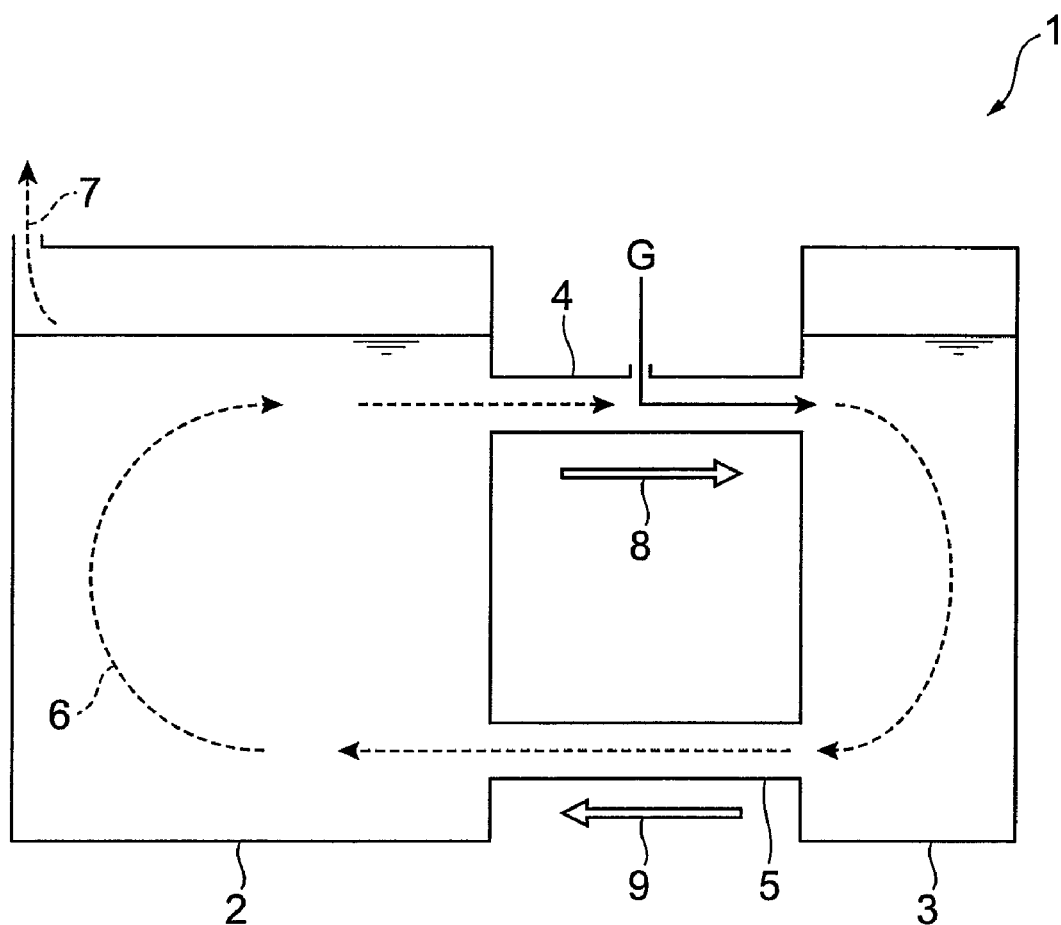
FIG. 1 is an illustration of the construction of a preferred reactor for carrying out step (B).

A preferred embodiment for carrying out the invention will now be described in detail.

According to this embodiment, fine bubbles composed of oxygen-containing gas with diameters of 0.05-500 μm are produced in the suspension during the oxidizing treatment of step (B).

Fine bubbles with diameters of several μm to several hundred μm are generally referred to as "microbubbles" while fine bubbles of several nm-1 μm are referred to as "nanobubbles", and these can be produced using a microbubble generator or nanobubble generator, respectively. Microbubble generators are poorly suited for introducing fine bubbles into static liquids, and most operate on the principle of creating a flow in the solution to produce a solution containing microbubbles in the liquid phase. Most nanobubble generators operate on the principle of causing micronization by application of ultrasonic waves to microbubbles.

The present inventors believe that the excellent effect obtained using fine bubbles in step (B) according to this embodiment is due to the following reason. When fine bubbles with small diameters such as microbubbles or nanobubbles are present in large amounts in a reaction mixture, the interface area between the liquid phase and gas phase increases. Since the oxidation reaction occurs at the gas/liquid interface between the solution and the fine bubbles, the oxidation reaction proceeds more efficiently. Also, since decreasing the fine bubble sizes lengthens the residence time in the solution, the reaction efficiency with ferrous hydroxide also increases. In addition, from the viewpoint of the principle of generating microbubbles or nanobubbles, given that the solution is being constantly circulated, this embodiment is suitable for production processes designed to carry out uniform oxidation reaction between gas and liquid. The oxidation reaction occurs in a uniform manner if the diameters of the fine bubbles are consistent, and therefore iron oxyhydroxide particles with a narrow particle size distribution can be obtained. Because the fine bubble diameter distribution is narrower than bubbles generated with an circulating apparatus, the particle size distribution of the iron oxyhydroxide particles is also narrowed.

The process for production of iron oxyhydroxide particles according to this embodiment comprises a step (A) in which a suspension containing iron(II) is prepared, and a step (B) in which a reaction mixture is prepared containing the suspension and fine bubbles with diameters of 0.05-500 μm, generated by at least one type of microbubble generator or nanobubble generator, and the iron(II) in the reaction mixture is oxidized by the bubbles to produce iron oxyhydroxide particles. Each of these steps will now be explained in order.

Step (A)

Step (A) is a step in which a suspension containing a ferrous salt is prepared. The suspension containing the ferrous salt need only be one capable of producing iron oxyhydroxide particles by the subsequent step (B), but it is preferred in step (A) to prepare the suspension by mixing a ferrous salt aqueous solution with an alkali aqueous solution containing one or more alkali carbonates and alkali hydroxides.

<Ferrous Salt Aqueous Solution>

As ferrous salts for the ferrous salt aqueous solution there may be used ferrous salts containing divalent iron, such as ferrous sulfate ($FeSO_4$), ferrous chloride ($FeCl_2$) and the like.

An increased concentration of iron(II) ($Fe^{2+}$) (hereinafter referred to as Fe concentration) in the reaction mixture will increase the particle sizes of the iron oxyhydroxide particles that are finally produced as a result, and therefore it is preferably no greater than 0.1 mol/L. It is more preferably no greater than 0.05 mol/L. On the other hand, an excessively low Fe concentration will tend to drastically reduce the number of iron oxyhydroxide particles produced, thus lowering the yield. Consequently, the Fe concentration in the reaction mixture is preferably at least 0.001 mol/L and more preferably at least 0.01 mol/L.

<Alkali Aqueous Solution>

The alkali aqueous solution functions as a neutralizer for the ferrous salt aqueous solution. As alkali aqueous solutions there are preferred one or more alkali carbonate aqueous solutions or alkali hydroxide aqueous solutions.

As alkali carbonates there may be used one or more from among ammonium carbonate ($(NH_4)_2CO_3$), ammonium hydrogencarbonate ($(NH_4)HCO_3$), sodium hydrogencarbonate ($NaHCO_3$), sodium carbonate ($Na_2CO_3$) and potassium carbonate ($K_2CO_3$). Sodium hydrogencarbonate is preferred among these.

As alkali hydroxides there may be used one or more from among sodium hydroxide (NaOH), ammonium hydroxide ($NH_4OH$) and potassium hydroxide (KOH). Sodium hydroxide is preferred among these.

The alkaline concentration of the alkali aqueous solution is preferably such so that the alkali equivalents with respect to iron(II) is in excess for neutralization. A nearly equivalent amount will tend to produce particulate magnetite while a less than equivalent amount of alkali will produce a yield less than the amount of loaded Fe, resulting in residual Fe ion in the waste liquid and thus requiring treatment of the waste liquid.

The pH of the alkali aqueous solution is preferably in the range of 9-11 and more preferably in the range of 9.5-10.5. A pH of lower than 9 will tend to produce an amorphous form and lower the yield of iron oxyhydroxide particles. A pH of greater than 11 will promote growth of the iron oxyhydroxide particles in the long axis direction, thus tending to prevent production of fine iron oxyhydroxide particles of the desired size.

For this embodiment, the alkali carbonate has the effect of inhibiting growth of the iron oxyhydroxide particles in the long axis direction. On the other hand, alkali hydroxides, which are stronger alkalis than alkali carbonates, characteristically tend to more easily yield product by neutralization reaction.

<Neutralization>

Neutralization reaction is carried out by combining the ferrous salt aqueous solution prepared as described above with an alkali aqueous solution containing one or more alkali carbonates and alkali hydroxides. The neutralization reaction is preferably conducted in an airtight container which has been shutted out of oxygen, i.e. has an non-oxidizing atmosphere.

The following neutralization reactions occur when, for example, ferrous sulfate is used as the ferrous salt, sodium hydrogencarbonate is used as the alkali carbonate and sodium hydroxide is used as the alkali hydroxide. The reaction produces ferrous carbonate ($FeCO_3$: iron(II) carbonate), ferrous bicarbonate ($Fe(HCO_3)_2$: iron(II) carbonate) and ferrous hydroxide ($Fe(OH)_2$: iron(II) hydroxide).

$$FeSO_4 + NaHCO_3 \rightarrow FeCO_3 + NaHSO_4$$

$$FeSO_4 + 2NaHCO_3 \rightarrow Fe(HCO_3)_2 + Na_2SO_4$$

$$FeSO_4 + 2NaOH \rightarrow Fe(OH)_2 + Na_2SO_4$$

The treatment temperature for the neutralization reaction is preferably one at which step (B) occurs in order to rapidly progress to subsequent step (B) in which the iron oxyhydroxide particle precursor is obtained. Since step (B) is preferably carried out at −5 to 25° C. for this embodiment, the neutralization reaction is also preferably carried out at the same temperature. The neutralization reaction time is preferably no greater than 60 minutes and more preferably no greater than 30 minutes, in order to prevent unwanted growth and aggregation of the neutralized ferrous hydroxide particles.

Step (B)

A suspension containing the ferrous salt produced as described above, such as a suspension containing ferrous carbonate, ferrous bicarbonate and ferrous hydroxide, is combined with fine bubbles having diameters of 0.05-500 μm to form a reaction mixture, and the iron(II) in the reaction mixture is oxidized by the bubbles to produce iron oxyhydroxide particles. The fine bubbles are used for oxidation of all or a portion of the iron(II) in the reaction mixture.

Although the fine bubbles have diameters in the range of 0.05-500 μm for this embodiment, they are preferably in the range of 0.1-200 μm and more preferably in the range of 0.1-100 μm. At less than 0.05 μm, the area at the gas/liquid interface will be increased and the oxidation rate will be accelerated, resulting in more difficult oxidation and precipitation of the iron oxyhydroxide particles and greater residue of green rust, thus lowering the iron oxyhydroxide particle yield to a point unsuitable for industrial production. Green rust will be described hereunder. At greater than 500 μm, the residence time of the fine bubbles in the solution will be shortened, lowering the contact efficiency with the divalent iron, and therefore inhibiting oxidation reaction and resulting in an unsuitable size larger than the desired size for the iron oxyhydroxide particles. The diameters of the bubbles may be measured by using a camera to photograph the bubbles blown in the suspension.

The feed rate of oxygen-containing gas (hereinafter referred to as "flow rate") is preferably 0.1-12 L/min, more preferably 0.1-10 L/min and even more preferably 1-3 L/min, assuming a reaction mixture volume of about 100 L, for example. At less than 0.1 L/min the fine bubble generation will be reduced, thus inhibiting oxidation reaction of the iron oxyhydroxide particles and tending to result in a larger size than the desired iron oxyhydroxide particle size. At greater than 12 L/min, the oxidation rate will be accelerated, tending to result in more difficult oxidation and precipitation of the iron oxyhydroxide particles, as well as greater residue of green rust which tends to lower the iron oxyhydroxide particle yield. The oxygen-containing gas flow rate is appropriately adjusted depending on the amount of reaction mixture.

FIG. 1 is an illustration of the construction of a preferred reactor for carrying out step (B).

As shown in FIG. 1, the reactor 1 comprises basically a reaction tank 2 in which the suspension (which serves as the reaction mixture after mixture with the fine bubbles) is placed, a microbubble generator 3 for supply of the fine bubbles, a supply tube 4 through which the suspension and the externally fed gas are directed into the microbubble generator 3, and an outlet tube 5 through which the reaction mixture comprising the mixed suspension and fine bubbles is directed out of the microbubble generator 3. The suspension (reaction mixture) is circulated between the reaction tank 2 and microbubble generator 3, and it passes through the supply tube 4 into the microbubble generator 3 (arrow 8), and then through the outlet tube 5 together with the fine bubbles to be returned to the reaction tank 2 (arrow 9). The gas fed to the supply tube 4 (indicated as G in FIG. 1) is emitted as fine bubbles by the microbubble generator 3. Most of the emitted fine bubbles are consumed by oxidation of the suspension, but the unreacted fine bubbles are fed into the microbubble generator 3 together with the suspension (arrow 6) while a portion of the unreacted fine bubbles naturally escape to the outside through a leak hole formed on the upper covering of the reaction tank 2, as indicated by the arrow 7. The suspension (reaction mixture) and fine bubbles are thus circulated and agitated by the process, and this also helps to accelerate the reaction for more efficient oxidation of the iron(II).

The microbubble generator 3 used may be the apparatus described in Utility Model Registration No. 3003581, for example. This apparatus has a structure with stirring blades built into a microbubble generator 3, wherein the pumped fluid (suspension and gas in this case) passes through the stirring blades, resulting in ejection of a fluid containing fine bubbles. Thus, since the suspension (reaction mixture) in the reaction tank 2 becomes agitated even without using any other agitating means in the reaction tank 2, it is possible to accomplish uniform oxidation reaction. The sizes of the fine bubbles can be controlled by varying the flow rate. The microbubble generator 3 may, alternatively, be a generator of the type in a swirl system, pressure melting system, Venturi system, ejector system or cavitation system.

The gas supplied to the microbubble generator 3 may be any oxidizing gas capable of oxidizing iron(II), but an oxygen-containing gas is preferred as the oxidizing gas. The oxygen-containing gas may be air, or a mixed gas comprising oxygen and an inert gas such as nitrogen, prepared to the desired oxygen component ratio.

The iron oxyhydroxide particles as the intermediate product of the magnetic fine powder, though being particles with a particle length of no greater than 150 nm and preferably no greater than 70 nm, and an axial ratio of 3 or greater, ideally have uniform particle shapes and extremely low variation, with a size distribution (standard deviation/particle length average) of no greater than 0.27 and more preferably no greater than 0.2.

According to this embodiment, it is sufficient if only a portion, and not all, of the iron(II) in the suspension is oxidized during production of the iron oxyhydroxide particles. Also according to this embodiment, step (B) preferably includes a first oxidizing treatment step in which the suspension obtained in step (A) is converted into a reaction mixture containing fine bubbles composed of oxygen-containing gas with diameters of 0.05-500 μm, while controlling the constant temperature range to preferably −5 to 30° C. and more preferably −5 to 25° C., and the iron(II) in the reaction mixture is oxidized at an oxidation rate of preferably 20-65% and more preferably 30-65%, to obtain an iron oxyhydroxide particle precursor. By producing green rust as the iron oxyhydroxide particle precursor at low temperature in this manner, it is possible to obtain iron oxyhydroxide particles with uniform particle sizes and shapes, having a particle length of no greater than 150 nm and preferably no greater than 70 nm. Such fine iron oxyhydroxide particles can be applied for large-capacity, high recording density magnetic recording media with excellent magnetic shape anisotropy and high coercive force.

When only a portion of the iron(II) in the suspension is oxidized during production of the iron oxyhydroxide particles, the extent of oxidation with respect to the total of the iron(II) in the ferrous salt used as the starting material, i.e. the oxidation rate, is preferably 20-65%, more preferably 30-65% and even more preferably 35-50%. An iron(II) oxidation rate of less than 20% will promote growth of the iron oxyhydroxide particles in the long axis direction, thus tending to prevent production of fine iron oxyhydroxide particles of the desired size. On the other hand, an oxidation rate of greater than 65% will tend to result in an amorphous form and a lower iron oxyhydroxide particle yield. The oxidation rate may be adjusted by the oxygen partial pressure and time for blowing the oxygen-containing gas into the suspension. A longer time or a higher oxygen component ratio will increase the oxidation rate. The oxidation rate may be determined in the following manner. First, the oxygen content necessary for oxidation of the total amount of iron(II) in the suspension is defined as y. The oxygen content consumed by oxidation is defined as x, which is determined from the difference between the oxygen content of the oxygen-containing gas introduced into the suspension and the oxygen content of the oxygen-containing gas that has passed through the suspension. The oxidation rate is the value calculated from y and x using the formula $x/y \times 100(\%)$.

The oxygen component ratio of the oxygen-containing gas used for nucleation is preferably 0.01-0.3 and more preferably 0.1-0.2. If the oxygen component ratio is less than 0.01, oxidation will proceed slowly and growth of green rust will increase, thus tending to prevent production of iron oxyhydroxide particles of the desired size. At greater than 0.3, the oxidation rate will be accelerated, tending to result in more difficult oxidation and precipitation of the iron oxyhydroxide particles, as well as greater residue of green rust which tends to lower the iron oxyhydroxide particle yield. The oxygen component ratio may be modified using a mixed gas comprising oxygen and an inert gas such as nitrogen. Although a mixed gas must be used to adjust the oxygen component ratio to 0.2-0.3, air can be used instead of oxygen for 0.2 and below, and this is preferred for industrial production for cost reduction and simplification of the oxygen component ratio adjustment.

This iron oxyhydroxide particle precursor is commonly known as green rust (Green Rust, S. H. DRISSI, Ph. REFAIT etc., Corrosion Science, vol. 37, No. 12, pp. 2025(1995)). According to this publication, there exist two types of green rust, GR1 which contains carbonate ion and has the chemical formula $[Fe_4^{(II)}Fe_2^{(III)}(OH)_{12}][CO_3 \cdot 2H_2O]$ (stoichiometric composition), and GR2 which contains sulfate ion and has the chemical formula $[Fe_4^{(II)}Fe_2^{(III)}(OH)_{12}][SO_4 \cdot 2H_2O]$ (stoichiometric composition). The hydroxyl $OH^-$ in the green rust is produced by ionization of alkali carbonates. The iron oxyhydroxide particles are produced via green rust as the reaction intermediate.

According to this embodiment, the oxygen-containing gas for fine bubble production is preferably blown into the suspension with the suspension constant temperature controlled to preferably −5 to 30° C., more preferably −5 to 25° C. and even more preferably 0 to 10° C. If the temperature of the suspension through which the oxygen-containing gas is blown in is no higher than 30° C., more preferably no higher than 25° C. and even more preferably no higher than 10° C., it will be possible to reduce the particle size of the green rust and thereby reduce the particle sizes (particle lengths) of the iron oxyhydroxide particles. However, a liquid temperature of above 30° C. will promote parallel production and growth of green rust, thus tending to result in larger particle sizes of the iron oxyhydroxide particles. Mixed heterophases such as hematite may also be present. On the other hand, a liquid temperature of below −5° C. will tend to result in freezing of the aqueous solution, making it difficult to produce green rust.

The blowing time for the oxygen-containing gas is preferably 10-180 minutes and more preferably 20-60 minutes in order to ensure production of green rust while controlling its growth.

The suspension in which the iron oxyhydroxide particle precursor has been produced by the first oxidizing treatment is preferably subjected to the following second oxidizing treatment to obtain the iron oxyhydroxide particles. Specifically, the oxygen-containing gas is blown in while heating the suspension in which green rust has been produced to control the liquid temperature to preferably 20° C. or higher and below 60° C., and more preferably 25° C. or higher and below 45° C. Blowing in the oxygen-containing gas oxidizes the iron oxyhydroxide particle precursor to produce iron oxyhydroxide particles. A suspension temperature of below 20° C. will tend to produce an amorphous form and lower the yield of iron oxyhydroxide particles. On the other hand, a suspension temperature of 60° C. or higher will tend to result in inclusion of a hematite heterophase.

The oxygen-containing gas is preferably blown in as fine bubbles, in the same manner as the first oxidizing treatment. The oxygen component ratio of the oxygen-containing gas is preferably in the range of 0.05-0.4 and more preferably in the range of 0.1-0.2. If the oxygen component ratio is less than 0.05, oxidation will proceed slowly and growth of the iron oxyhydroxide particles will increase, thus tending to prevent production of iron oxyhydroxide particles of the desired size. On the other hand, an oxygen component ratio of greater than 0.4 will tend to lower the yield of the iron oxyhydroxide particles.

The series of steps described above produce iron oxyhydroxide particles as the precursor for metal magnetic particles. The iron oxyhydroxide particles that are produced, even though they are fine particles, have a narrow particle size distribution, with particle lengths of 20-150 nm and preferably 20-70 nm and an axial ratio of 3 or greater.

While the iron oxyhydroxide particles may be produced in the manner described above, metal magnetic particles can be obtained by coating and/or doping the iron oxyhydroxide particles with a sintering inhibitor and then carrying out reduction treatment. The reduction treatment may involve holding at 300-600° C. for 0.25-72 hours in a reducing gas stream of hydrogen gas or the like. Nitriding treatment in a gas such as $NH_3$ may also be carried out to obtain iron nitride magnetic particles. A gas containing trace oxygen may subsequently be used to form a thin oxide film on the magnetic particle or iron nitride magnetic particle surfaces. The magnetic particles obtained in this manner are needle-like magnetic particles with particle lengths of no greater than 150 nm and preferably no greater than 70 nm, and thus have a narrow particle size distribution.

EXAMPLES

Example 1

An iron sulfate aqueous solution was prepared using iron sulfate heptahydrate ($FeSO_4 \cdot 7H_2O$) as the ferrous salt for the iron starting material. Sodium hydrogencarbonate ($NaHCO_3$) was then added as a neutralizer to ion-exchanged water. The neutralizer was added at 4 equivalents to the iron starting material. Sodium hydroxide (NaOH) was then mixed therewith to obtain an alkali aqueous solution. Mixture of the iron starting material solution and the neutralizer solution was adjusted for an Fe concentration of 0.05 mol/L in the reaction mixture. A microbubble generator (MICROBUBBLER Z, product of Zenken Corp.) was used to generate nitrogen gas microbubbles, and after deaeration and mixing, an $FeSO_4$ aqueous solution was added thereto for neutralization and precipitation to obtain a suspension (step (A)). The liquid temperature during and after neutralization was controlled to a constant 17° C.

The mixing was followed next by step (B). Oxygen-containing gas with an oxygen component ratio of 0.3 was supplied at 0.08 L/min, and fine bubbles with a bubble diameter of 28 μm were formed in the suspension for oxidation of the iron(II) (first oxidizing treatment). This procedure oxidized 40% of the iron(II) sulfate starting material. After oxidation, the oxidizing gas was replaced with nitrogen gas, the temperature was raised to 30° C., and the remaining divalent iron(II) was oxidized with the fine bubbles to obtain iron oxyhydroxide particles (second oxidizing treatment). The fine bubbles were produced using a reactor having the construction shown in FIG. 1.

The particle lengths, axial ratios and particle size distribution of the obtained iron oxyhydroxide particles were determined. The particle sizes of the iron oxyhydroxide particles were determined by measuring the particle lengths and particle widths (short axis lengths) of 100 particles using a TEM (Transmission Electron Microscope). The averages for the particle lengths and particle widths of the 100 particles were recorded as the particle length and particle width, respectively. The axial ratio was determined from the particle width (average) and particle length (average) of the 100 particles, as (particle length/particle width). The particle size distribution was determined by the ratio of the standard deviation and particle length (average) (particle length standard deviation/mean particle length, CV) obtained for the 100 particles. A smaller CV value indicates lower particle size variation. The results are shown in Table 1.

Example 2

Iron oxyhydroxide particles were obtained in the same manner as Example 1, except that in step B, the iron(II) in the suspension was oxidized with an oxygen component ratio of 0.10, an oxygen-containing gas flow rate of 12 L/min and a bubble diameter of 150 μm. The reaction mixture volume was 100 L.

The obtained iron oxyhydroxide particles were measured in the same manner as Example 1. The results are shown in Table 1.

Example 3

Iron oxyhydroxide particles were obtained in the same manner as Example 1, except that in step (B), the iron(II) in the suspension was oxidized with an oxygen component ratio of 0.15, an oxygen-containing gas flow rate of 2 L/min and a bubble diameter of 46 μm.

The obtained iron oxyhydroxide particles were measured in the same manner as Example 1. The results are shown in Table 1.

Example 4

Iron oxyhydroxide particles were obtained in the same manner as Example 1, except that in step (A), the temperature during and after neutralization was controlled to a constant 0° C., and in step (B), the iron(II) in the suspension was oxidized with an oxygen component ratio of 0.15, an oxygen-containing gas flow rate of 2 L/min and a bubble diameter of 46 μm.

The obtained iron oxyhydroxide particles were measured in the same manner as Example 1. The results are shown in Table 1.

Example 5

Iron oxyhydroxide particles were obtained in the same manner as Example 1, except that in step (A), the temperature during and after neutralization was controlled to a constant 30° C., and in step (B), the iron(II) in the suspension was oxidized with an oxygen component ratio of 0.15, an oxygen-containing gas flow rate of 2 L/min and a bubble diameter of 46 μm.

The obtained iron oxyhydroxide particles were measured in the same manner as Example 1. The results are shown in Table 1.

Example 6

Iron oxyhydroxide particles were obtained in the same manner as Example 1, except that in step (B), 60% of the iron(II) sulfate starting material as the iron(II) in the suspension was oxidized with an oxygen component ratio of 0.15, an oxygen-containing gas flow rate of 2 L/min and a bubble diameter of 46 μm.

The obtained iron oxyhydroxide particles were measured in the same manner as Example 1. The results are shown in Table 1.

Example 7

Iron oxyhydroxide particles were obtained in the same manner as Example 1, except that in step (B), 20% of the iron(II) sulfate starting material as the iron(II) in the suspension was oxidized with an oxygen component ratio of 0.15, an oxygen-containing gas flow rate of 2 L/min and a bubble diameter of 46 μm.

The obtained iron oxyhydroxide particles were measured in the same manner as Example 1. The results are shown in Table 1.

Example 8

Iron oxyhydroxide particles were obtained in the same manner as Example 1, except that in step (B), the iron(II) in the suspension was oxidized with an oxygen component ratio of 0.15, an oxygen-containing gas flow rate of 3 L/min and a bubble diameter of 51 μm.

The obtained iron oxyhydroxide particles were measured in the same manner as Example 1. The results are shown in Table 1.

Example 9

Iron oxyhydroxide particles were obtained in the same manner as Example 1, except that in step (B), the iron(II) in the suspension was oxidized with an oxygen component ratio of 0.15, an oxygen-containing gas flow rate of 2 L/min and a bubble diameter of 0.1 μm.

The obtained iron oxyhydroxide particles were measured in the same manner as Example 1. The results are shown in Table 1.

Example 10

Iron oxyhydroxide particles were obtained in the same manner as Example 1, except that in step (B), the iron(II) in the suspension was oxidized with an oxygen component ratio of 0.30, an oxygen-containing gas flow rate of 2 L/min and a bubble diameter of 46 μm.

The obtained iron oxyhydroxide particles were measured in the same manner as Example 1. The results are shown in Table 1.

Example 11

Iron oxyhydroxide particles were obtained in the same manner as Example 1, except that in step (A), an iron sulfate aqueous solution was prepared having an iron(II) concentration (Fe concentration) of 0.15 mol/L in the reaction mixture, and in step (B), the iron(II) in the suspension was oxidized with an oxygen component ratio of 0.15, an oxygen-containing gas flow rate of 2 L/min and a bubble diameter of 46 μm.

The obtained iron oxyhydroxide particles were measured in the same manner as Example 1. The results are shown in Table 1.

Example 12

Iron oxyhydroxide particles were obtained in the same manner as Example 1, except that in step (B), the iron(II) in the suspension was oxidized with an oxygen component ratio of 0.02, an oxygen-containing gas flow rate of 5 L/min and a bubble diameter of 55 μm.

The obtained iron oxyhydroxide particles were measured in the same manner as Example 1. The results are shown in Table 1.

Comparative Example 1

An iron sulfate aqueous solution was prepared using iron sulfate heptahydrate ($FeSO_4 \cdot 7H_2O$) as the ferrous salt for the iron starting material, with an iron(II) concentration (Fe concentration) of 0.15 mol/L in the reaction mixture. Sodium hydrogencarbonate ($NaHCO_3$) was used as a neutralizer added at 4 equivalents with respect to the iron starting material, and then sodium hydroxide (NaOH) and ion-exchanged water were mixed therewith to prepare an alkali aqueous solution. After deaeration with nitrogen gas, a stirrer was used for stirring and mixing, and then an $FeSO_4$ aqueous solution was added thereto for neutralization and precipitation to obtain a suspension (step (A)). The liquid temperature during and after neutralization was controlled to a constant 17° C. After mixing, an oxygen-containing gas with an oxygen component ratio of 0.5 was blown in through a syringe at a flow rate of 1 L/min and a bubble diameter of 2.5 mm ($2.5 \times 10^3$ μm) for oxidation. In step (B), 40% of the iron(II) sulfate starting material was oxidized. After oxidation, the oxidizing gas was replaced with nitrogen gas, the temperature was raised to 30° C. and the remaining divalent iron(II) was oxidized to obtain iron oxyhydroxide particles.

The obtained iron oxyhydroxide particles were measured in the same manner as Example 1. The results are shown in Table 1.

Comparative Example 2

Iron oxyhydroxide particles were obtained in the same manner as Comparative Example 1, except that the oxygen component ratio was 0.15 in step (B).

The obtained iron oxyhydroxide particles were measured in the same manner as Example 1. The results are shown in Table 1.

Comparative Example 3

Iron oxyhydroxide particles were obtained in the same manner as Comparative Example 1, except that in step (A), an iron sulfate, aqueous solution was prepared with an iron(II) concentration (Fe concentration) of 0.05 mol/L in the reaction mixture and the liquid temperature during and after neutralization was controlled to a constant 0° C., while in step (B), the oxygen component ratio was 0.005 and the bubble diameter was 1.7 mm ($1.7 \times 10^3$ μm).

The obtained iron oxyhydroxide particles were measured in the same manner as Example 1. The results are shown in Table 1.

TABLE 1

| | | | | Step (B) | | | | | | |
|---|---|---|---|---|---|---|---|---|---|---|
| | Gas flow rate [L/min] | Bubble diameter [μm] | Step (A) Fe conc. [mol/L] | Oxidation rate [%] | Temp. [° C.] | Oxygen component ratio | Partical length [nm] | Axial ratio | CV | Note |
| Example 1 | 0.08 | 28 | 0.05 | 40 | 17 | 0.30 | 149 | 5.3 | 0.27 | |
| Example 2 | 12.0 | 150 | 0.05 | 40 | 17 | 0.10 | 24 | 3.5 | 0.25 | |
| Example 3 | 2.0 | 46 | 0.05 | 40 | 17 | 0.15 | 55 | 4.2 | 0.17 | |
| Example 4 | 2.0 | 46 | 0.05 | 40 | 0 | 0.15 | 42 | 4.5 | 0.15 | |
| Example 5 | 2.0 | 46 | 0.05 | 40 | 30 | 0.15 | 80 | 4.5 | 0.24 | |
| Example 6 | 2.0 | 46 | 0.05 | 60 | 17 | 0.15 | 45 | 4.1 | 0.18 | |
| Example 7 | 2.0 | 46 | 0.05 | 20 | 17 | 0.15 | 72 | 4.5 | 0.16 | |
| Example 8 | 3.0 | 51 | 0.05 | 40 | 17 | 0.15 | 50 | 4.6 | 0.17 | |
| Example 9 | 2.0 | 0.1 | 0.05 | 40 | 17 | 0.15 | 52 | 4.4 | 0.14 | |
| Example 10 | 2.0 | 46 | 0.05 | 40 | 17 | 0.30 | 44 | 4.5 | 0.17 | |
| Example 11 | 2.0 | 46 | 0.15 | 40 | 17 | 0.15 | 62 | 4.8 | 0.23 | |
| Example 12 | 5.0 | 55 | 0.05 | 40 | 17 | 0.02 | 88 | 5.0 | 0.20 | |
| Comp. Ex. 1 | 1.0 | $2.5 \times 10^3$ | 0.15 | 40 | 17 | 0.50 | 90 | 4.5 | 0.26 | Gas supply |
| Comp. Ex. 2 | 1.0 | $2.5 \times 10^3$ | 0.15 | 40 | 17 | 0.15 | 132 | 4.7 | 0.28 | with |
| Comp. Ex. 3 | 1.0 | $1.7 \times 10^3$ | 0.05 | 40 | 0 | 0.005 | 291 | 5.5 | 0.21 | syringe |

The following conclusions may be drawn from Table 1.

With a bubble diameter of 500 μm or smaller, it was possible to obtain fine iron oxyhydroxide particles with a narrow particle size distribution, having a particle length of no greater than 80 nm, an axial ratio of 3 or greater and a small CV (Examples 2-11).

Comparative Example 1 had a large particle length of 90 nm compared to the examples with a treatment temperature of 17° C. in step (B), but fine iron oxyhydroxide particles were produced by using microbubbles.

Also, despite an oxygen component ratio of no greater than 0.3 in step (B) in Examples 1-12, it was still possible to produce fine iron oxyhydroxide particles having a particle length of no greater than 150 nm and an axial ratio of 3 or greater. However, limiting the oxygen component ratio to no greater than 0.3 in Comparative Example 1 resulted in a slow oxidation rate and growth of large iron oxyhydroxide precursors, and therefore the oxygen component ratio was set to 0.5 in order to obtain iron oxyhydroxide particles with a particle length of no greater than 0.1 μm and an axial ratio of 3 or greater. As explained above, an oxygen component ratio of greater than 0.3 results in an excessively accelerated oxidation rate and renders oxidation and precipitation of the iron oxyhydroxide particles more difficult, as well as producing greater residue of green rust, thus lowering the iron oxyhydroxide particle yield. The particle length is increased when the oxygen component ratio is 0.15 as in Comparative Example 2 or when the oxygen component ratio is 0.005 as in Comparative Example 3.

What is claimed is:

1. A process for production of iron oxyhydroxide particles, comprising
    a step (A) in which a suspension containing iron(II) is prepared,
    a step (B) in which fine bubbles of oxygen-containing gas with diameters of 0.05-500 μm are generated in the suspension to form a reaction mixture, and the iron(II) in the reaction mixture is oxidized by the bubbles to produce iron oxyhydroxide particles, and
    the step (B) includes a step of obtaining an iron oxyhydroxide particle precursor by oxidizing the iron(II) in the reaction mixture at an oxygen component ratio with respect to the oxygen-containing gas of 0.01 to 0.3.

2. A process for production of iron oxyhydroxide particles according to claim 1, characterized in that
    the step (A) is a step in which a ferrous salt aqueous solution is mixed with an alkali aqueous solution containing one or more alkali carbonates and alkali hydroxides, and
    in the step (B), the suspension is converted into the reaction mixture containing the fine bubbles while controlling a temperature range of the suspension to −5 to 30° C., and the iron(II) is oxidized at an oxidation ratio of 30-65% to obtain the iron oxyhydroxide particle precursor.

3. A process for production of iron oxyhydroxide particles according to claim 2, characterized in that in step (A),
    the Fe concentration of the ferrous salt aqueous solution is 0.001-0.1 mol/L in the reaction mixture.

4. A process for production of iron oxyhydroxide particles according to claim 1, characterized in that in step (B),
    the supply rate of the oxygen-containing gas is 0.1-12 L/min per 100 L of the reaction mixture.

5. A process for production of iron oxyhydroxide particles according to claim 1, characterized in that the iron oxyhydroxide particles obtained in step (B) have a mean particle length of 20-70 nm and an axial ratio of 3-10.

* * * * *